United States Patent
Lee et al.

(10) Patent No.: US 7,791,680 B2
(45) Date of Patent: Sep. 7, 2010

(54) DISPLAY APPARATUS HAVING AN IMPURITY ADSORPTION ELECTRODE DISPOSED IN A DISPLAY AREA

(75) Inventors: Jun-woo Lee, Anyang-si (KR);
Hee-seop Kim, Hwaseong-si (KR);
Chang-hun Lee, Yongin-si (KR);
Eun-hee Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 870 days.

(21) Appl. No.: 11/567,378

(22) Filed: Dec. 6, 2006

(65) Prior Publication Data
US 2007/0134883 A1  Jun. 14, 2007

(30) Foreign Application Priority Data
Dec. 6, 2005  (KR)  .................. 10-2005-0118173

(51) Int. Cl.
*G02F 1/1333* (2006.01)
*G02F 1/133* (2006.01)
*G02F 1/1343* (2006.01)
*G02B 26/00* (2006.01)
*G02F 1/13* (2006.01)

(52) U.S. Cl. .................. 349/54; 349/192; 349/34; 349/139; 359/296

(58) Field of Classification Search .................. 349/54, 349/192, 34
See application file for complete search history.

(56) References Cited

U.S. PATENT DOCUMENTS

| 6,798,476 | B2 * | 9/2004 | Hanakawa et al. | .......... 349/113 |
| 6,803,976 | B1 * | 10/2004 | Fujioka et al. | .......... 349/54 |
| 2005/0110928 | A1 * | 5/2005 | Sonoda et al. | .......... 349/114 |

FOREIGN PATENT DOCUMENTS

| JP | 08201830 A * | 8/1996 |
| JP | 2001-166322 | 6/2001 |
| JP | 2001-201734 | 7/2001 |
| JP | 2002-006300 | 1/2002 |

OTHER PUBLICATIONS

English language machine translation of Nakai et al. JP 08-201830 A.*

* cited by examiner

*Primary Examiner*—Andrew Schechter
*Assistant Examiner*—Michael Inadomi
(74) *Attorney, Agent, or Firm*—F. Chau & Associates, LLC

(57) ABSTRACT

A display device which can suppress an afterimage phenomenon from occurring includes a first plate including a pixel electrode which is disposed in a transmitting region and a first impurity adsorption electrode which is disposed in a light-shielding region and is separated from the pixel electrode, a second plate facing the first plate and including a second impurity adsorption electrode which is disposed in the light-shielding region to face the first impurity adsorption electrode, and an intermediate layer interposed between the first plate and the second plate.

18 Claims, 13 Drawing Sheets

DISPLAY APPARATUS HAVING AN IMPURITY ADSORPTION ELECTRODE DISPOSED IN A DISPLAY AREA

CROSS-REFERENCE TO RELATED APPLICATION

This application claims priority to Korean Patent Application No. 10-2005-0118173, filed on Dec. 6, 2005 in the Korean Intellectual Property Office, the disclosure of which is incorporated by reference herein in its entirety.

BACKGROUND OF THE INVENTION

1. Technical Field

The present invention relates to a display device, and more particularly, to a display device which can suppress an occurrence of an afterimage phenomenon.

2. Discussion of the Related Art

A liquid crystal display is one of the most widely used flat panel displays. For example, the liquid crystal display is commonly found in a variety of electronic devices such as flat screen televisions, laptop computers, cell phones, and digital cameras.

The liquid crystal display includes two substrates provided with field-generating electrodes such as pixel electrodes and a common electrode and a liquid crystal layer interposed therebetween. The liquid crystal layer includes liquid crystal molecules having optical anisotropy and dielectric anisotropy. The liquid crystal display displays images by applying voltages to the field-generating electrodes to generate an electric field in the liquid crystal layer. The electric field determines orientations of the liquid crystal molecules in the liquid crystal layer to adjust polarization of incident light.

However, when voltages having the same polarity are continuously applied to liquid crystal molecules, the liquid crystal molecules are degraded, and thus, a direct current (DC) bias accumulates and remains in a liquid crystal layer. The residual DC bias may transform a subsequent data voltage or produce an undesirable electric field in the liquid crystal layer even when no data voltage is supplied. To prevent the degradation of liquid crystal molecules, an inversion driving method for inverting the polarity of a voltage applied to a liquid crystal layer was developed.

Inversion driving includes frame inversion driving in which the polarity of a common voltage is inverted in units of frames, line inversion driving in which the polarity of the common voltage is inverted in units of gate lines when each gate line is scanned, dot inversion driving in which the polarity of the common voltage is inverted in units of pixels, etc. However, even though inversion driving is performed, a DC bias still remains in a liquid crystal layer due to a change in a kickback voltage, etc.

Meanwhile, ionic impurities, together with liquid crystal molecules, are floating in a liquid crystal layer. The ionic impurities are adsorbed to electrodes of upper and lower display panels due to a residual DC bias in the liquid crystal layer, thereby distorting the electric field in the liquid crystal layer. The distortion may cause an afterimage to appear on a screen. The afterimage is a phenomenon that occurs when an image of a previous frame remains without completely fading out to influence an image of a current frame.

Accordingly, there is a need for a liquid crystal display that is capable of suppressing the occurrence of an afterimage phenomenon that results from the concentration of ion impurity in the liquid crystal layer.

SUMMARY OF THE INVENTION

According to an exemplary embodiment of the present invention, there is provided a display device including a first plate including a pixel electrode which is disposed in a transmitting region and a first impurity adsorption electrode which is disposed in a light-shielding region and separated from the pixel electrode, a second plate facing the first plate and including a second impurity adsorption electrode which is disposed in the light-shielding region to face the first impurity adsorption electrode, and an intermediate layer interposed between the first plate and the second plate.

According to another exemplary embodiment of the present invention, there is provided a display device including a first plate including a first impurity adsorption electrode which is disposed along an outer edge of a display area and separated from a pixel electrode, a second plate facing the first plate and including a second impurity adsorption electrode which faces the first impurity adsorption electrode, and an intermediate layer interposed between the first plate and the second plate.

According to still another exemplary embodiment of the present invention, there is provided a display device including a first plate including a gate line connected to a control terminal of a thin film transistor in each pixel, a data line connected to an input terminal of the thin film transistor, a pixel electrode connected to an output terminal of the thin film transistor, and a first impurity adsorption electrode which is electrically isolated from and overlaps with the gate line or the data line and is separated from the pixel electrode, a second plate facing the first plate and including a lattice-shaped black matrix pattern and a second impurity adsorption electrode which is disposed below and overlapped with the black matrix pattern and faces the first impurity adsorption electrode, and a liquid crystal layer interposed between the first plate and the second plate.

According to a further exemplary embodiment of the present invention, there is provided a method of driving a display device including a first plate including a pixel electrode which is disposed in a transmitting region and a first impurity adsorption electrode which is disposed in a light-shielding region and separated from the pixel electrode, a second plate facing the first plate and including a second impurity adsorption electrode which is disposed in the light-shielding region to face the first impurity adsorption electrode, and an intermediate layer interposed between the first plate and the second plate, the method including applying a first voltage to the first impurity adsorption electrode; applying a second voltage to the second impurity adsorption electrode and setting an absolute value of an average potential difference between the first impurity adsorption electrode and the second impurity adsorption electrode to be greater than a residual DC bias in a transmitting region of the intermediate layer.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

A display device according to exemplary embodiments of the present invention will now be described with reference to the accompanying drawings. In the following description, the invention will be described with regard to a liquid crystal display; however, the present invention is not limited thereto.

Figure 1:
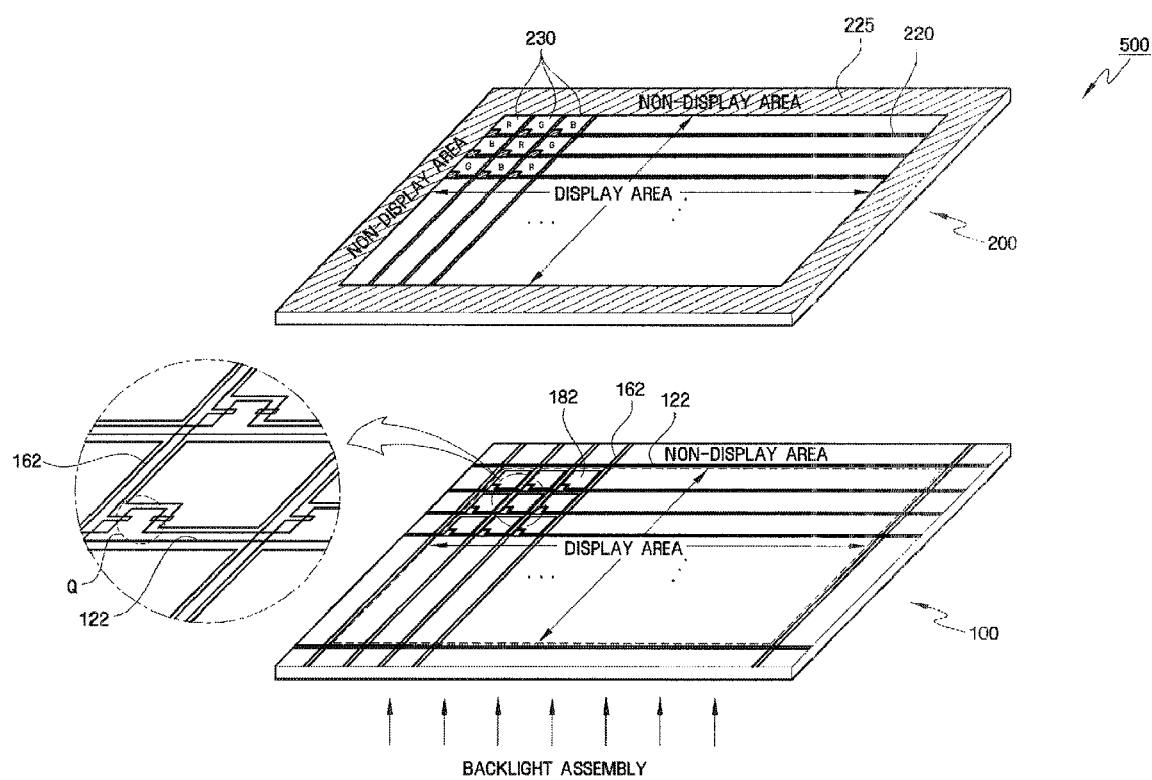
FIG. 1 is a perspective view illustrating a liquid crystal display according to an exemplary embodiment of the present invention.

FIG. 1 is a perspective view of a liquid crystal display 500 according to an exemplary embodiment of the present invention.

Referring to FIG. 1, the liquid crystal display 500 includes a first plate 100, a second plate 200 facing the first plate 100, and an intermediate layer (not shown) interposed between the first plate 100 and the second plate 200. Here, the intermediate layer of the liquid crystal display 500 may be a liquid crystal layer including liquid crystal molecules. As used herein, "a panel composed of a first plate, a second plate, and a liquid crystal layer" will also be referred to as a "a liquid crystal panel".

The first plate 100 includes a plurality of gate lines 122 which extend parallel to a first direction and a plurality of data lines 162 which extend parallel to a second direction. The plurality of gate lines 122 and the plurality of data lines 162 are made of a conductive material such as aluminum (Al), copper (Cu), silver (Ag), molybdenum (Mo), chromium (Cr), titanium (Ti), tantalum (Ta), or an alloy thereof, and may be formed as a single layer or a multi-layer of two or more layers. The plurality of gate lines 122 are provided to cross, for example, substantially perpendicular to each of the plurality of data lines 162, thereby defining each pixel, so that a thin film transistor Q and a pixel electrode 182 are provided at each pixel.

The second plate 200 includes lattice-shaped black matrix patterns 220 and color filter patterns 230. The black matrix pattern 220 is made of an opaque material and formed along the boundary of a pixel. The color matrix patterns 230, e.g., a red (R) color filter, a green (G) color filter, and a blue (B) color filter, are alternately arranged. Each of the respective color filters is surrounded by the black matrix pattern 220. In a modified embodiment, the respective color filters may have another arrangement, e.g., the color filters may correspond to complementary colors of red (R), green (G) and blue (B), but are not limited thereto. The color filter patterns 230, together with the black matrix patterns 220, form a display area. An outermost black matrix 225 is disposed in the second plate 200 along an outer edge of the display area and forms a non-display area. In the following description, the black matrix patterns 220 and the outermost black matrix 225 will be referred to as "black matrixes".

The outermost black matrix 225 is made of the same material as the black matrix patterns 220 in the display area, but it may have a greater width than each of the black matrix patterns 220. In other words, the widths of the black matrixes 220 and 225 vary according to the size of the liquid crystal display 500, the number of pixels, etc. For example, the black matrix patterns 220 in the display area may have a width of about 30 to 40 μm, whereas the outermost black matrix 225 in the non-display area may have a width of 0.5 to 50 mm.

The first plate 100 and the second plate 200 may be sealed to each other with a liquid crystal layer interposed therebetween. At this time, the gate lines 122 and the data lines 162 of the first plate 100 are aligned to overlap with the black matrixes 220 and 225 of the second plate 200. Dashed lines shown in the first plate 100 of FIG. 1 represent inner edges of the outermost black matrix 225, which corresponds to borderlines between the display area and the non-display area when the first plate 100 and the second plate 200 are aligned.

Meanwhile, a backlight assembly is disposed below the first plate 100. Light emitted from the backlight assembly is transmitted through the first plate 100, the liquid crystal layer, and the second plate 200.

At this time, the gate lines 122 and the data lines 162 of the first plate 100 block most of the light emitted from the backlight assembly since they are made of a conductive material, e.g., an opaque conductive material, to function as low resistance wires. On the other hand, pixel electrodes 182 covering most of pixel regions allow most of the light emitted from the backlight assembly to pass therethrough since they are made of Indium Tin Oxide (ITO) or Indium Zinc Oxide (IZO). The light emitted from the backlight assembly is transmitted through or blocked by the liquid crystal layer according to the arrangement of liquid crystal molecules. The arrangement of the liquid crystal molecules is controlled by the intensity of an electric field in the liquid crystal layer. The light emitted from the backlight assembly is blocked by the black matrixes 220 and 225 of the second plate 200, but is transmitted through the color filter patterns 230.

If the light emitted from the backlight assembly is blocked by one of the first plate 100, the liquid crystal layer, and the second plate 200, it cannot be transmitted through the liquid crystal panel. The transmission or blocking of light in the liquid crystal layer is determined by the electric field in the liquid crystal layer. A region that blocks light regardless of the electric field in the liquid crystal layer is defined as a "light-shielding region" of the liquid crystal panel. The light-shielding region of the liquid crystal panel is composed of a light-shielding region of the first plate 100 and a light-shielding region of the second plate 200. A region other than the light-shielding region of the liquid crystal panel, e.g., a region transmitting light according to the electric field, is defined as a "transmitting region" of the liquid crystal panel.

Figure 2:
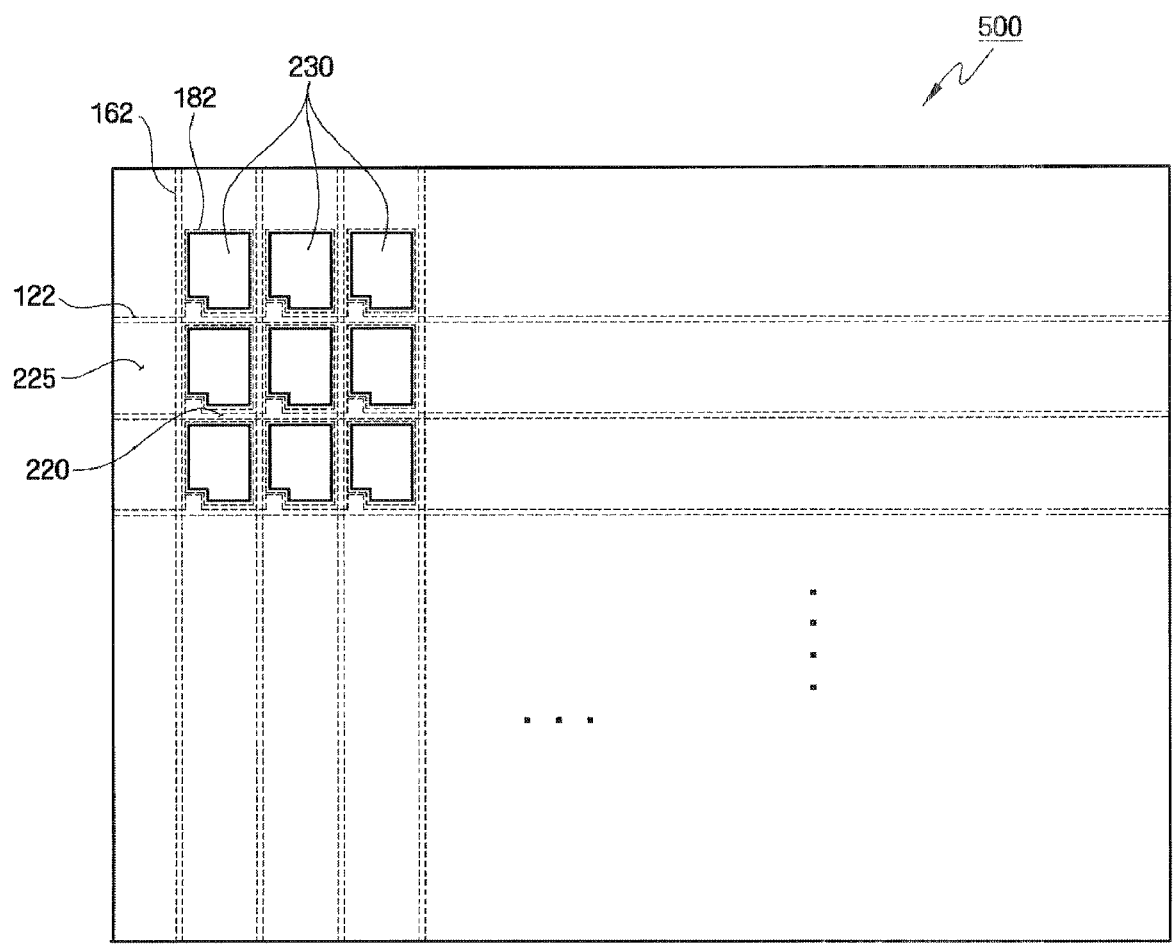
FIG. 2 is a plan view illustrating a liquid crystal display according to an exemplary embodiment of the present invention.

FIG. 2 is a plan view illustrating a liquid crystal display 500 according to an exemplary embodiment of the present invention. In FIG. 2, dashed lines represent gate lines 122, data lines 162, and pixel electrodes 182 of a first plate of the liquid crystal display 500.

Referring to FIG. 2, the gate lines 122 and the data lines 162 of the first plate, and black matrix patterns 220 of a second plate serve as light-shielding regions. A non-display area where an outermost black matrix 225 is disposed also serves as a light-shielding region.

The black matrix patterns 220 of the second plate may be aligned in the display area so that they overlap with the gate lines 122 and the data lines 162 of the first plate to minimize a light-shielding region. Furthermore, the black matrix patterns 220 may have greater widths than the gate lines 122 and the data lines 162 to prevent a light leakage phenomenon and enhance visibility. In other words, when viewed from the top, the black matrix patterns 220 may cover the gate lines 122 and the data lines 162.

Overlapping portions between the pixel electrodes 182 of the first plate and color filter patterns 230 of the second plate serve as transmitting regions. The color filter patterns 230 and the pixel electrodes 182 may overlap with each other so that the color filter patterns 230 are covered with the pixel electrodes 182.

A pixel unit of the liquid crystal display according to an embodiment of the present invention shown in FIG. 1 will now be described in greater detail.

Figure 3A:
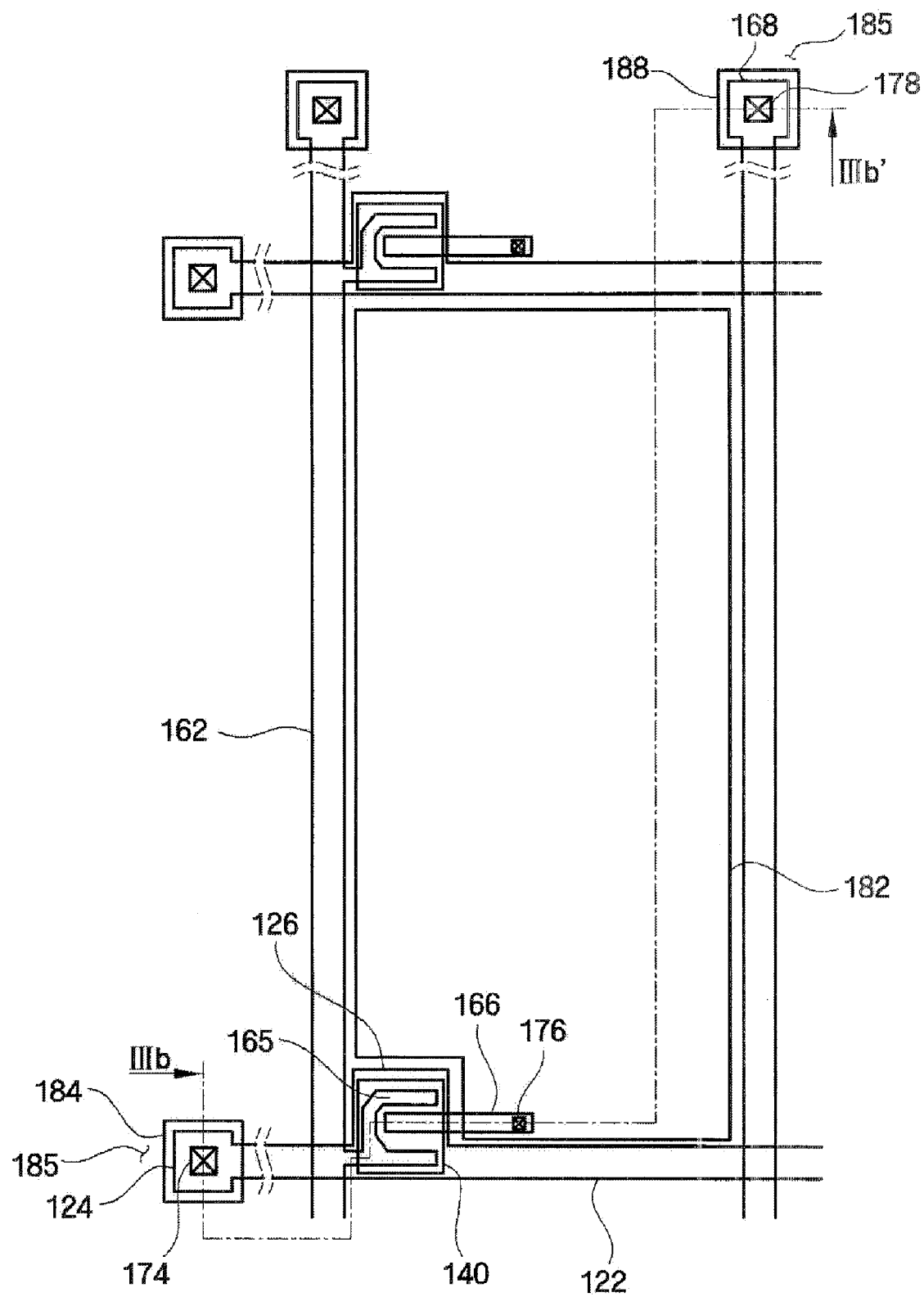
FIG. 3A is a layout view of a first plate of a liquid crystal display according to an exemplary embodiment of the present invention.
Figure 3B:
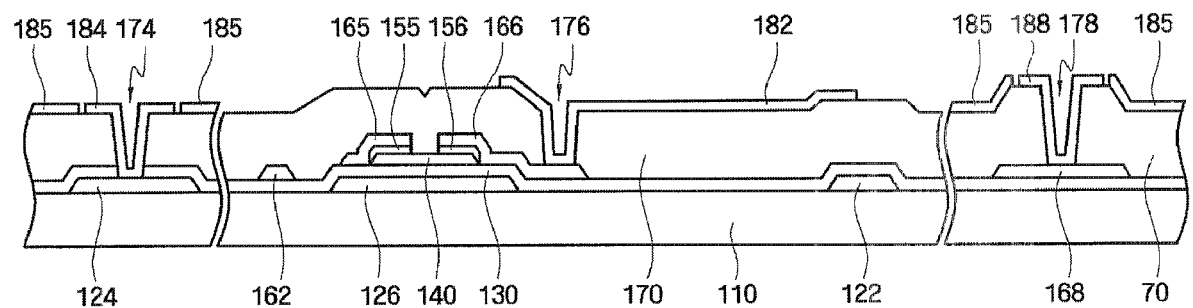
FIG. 3B is a sectional view taken along a line IIIb-IIIb' of FIG. 3A.

FIG. 3A is a layout view of a first plate 100 according to an exemplary embodiment of the present invention, and FIG. 3B is a sectional view taken along a line IIIb-IIIb' of FIG. 3A. For clarity, several components shown in FIG. 3B are not shown in FIG. 3A.

Referring to FIGS. 3A and 3B, a plurality of gate wires (122, 124, and 126) responsible for gate signal transmission are disposed on an insulating substrate 110. Each of the gate wires (122, 124, and 126) formed on the insulating substrate 110 includes a gate line 122 extending in a first direction (e.g., a transverse direction in FIG. 3A), a gate pad 124 connected to an end of the gate line 122 to receive a gate signal from an external device and transmit the received gate signal to the gate line 122, and a gate electrode 126 of a thin film transistor which is connected to the gate line 122 and formed on the insulating substrate 110 in a protrusion shape. Here, the gate wires 122, 124, and 126 may be formed on the insulating substrate 110 using a material such as Al, Cu, Mo, Cr, Ti, Ta, or an alloy thereof, but not limited thereto, by sputtering, followed by patterning using photolithography.

In addition, the gate wires 122, 124, and 126 may have a multi-layered structure of two or more layers. For example, the gate wires 122, 124, and 126 may include an underlying layer for improving adhesion to the insulating substrate 110 and functioning as a barrier film, a low-resistivity conductive film, and an underlying layer for blocking diffusion of materials constituting the low-resistivity conductive film and functioning as a capping film. One example of the multi-layered structure is a Mo/Ta/Ti layered structure. Also, conductive oxide and/or nitride may be used as the underlying and/or overlying layer materials. For example, an ITO/Ag/ITO layered structure may be used.

Although not shown, a storage electrode that increases storage capability of a pixel may further be formed on the same layer as that of the gate wires 122, 124 and 126. The storage electrode may be formed of the same material as the gate wires 122, 124 and 126, and may be deposited and patterned at the same time with the gate wires 122, 124 and 126. The storage electrode may vary in shape and arrangement. When storage capacity is sufficient due to overlapping between the pixel electrodes 182 and the gate lines 122, formation of the storage electrode may be omitted.

A gate insulating layer 130 made of silicon nitride (SiNx), etc. is formed on an entire surface of the substrate 110 having the gate wires 122, 124 and 126 by, for example, sputtering, reactive sputtering or chemical vapor deposition (CVD).

A semiconductor layer 140 is disposed on the gate insulating layer 130. The semiconductor layer 140 is made of a hydrogenated amorphous semiconductor. Ohmic contact layers 155 and 156 are disposed on the semiconductor layer 140. The ohmic contact layers 155 and 156, which are made of n+ hydrogenated amorphous silicon highly doped with an n-type impurity, are formed on the semiconductor layer 140. The ohmic contact layers 155 and 156 cover the semiconductor layer 140 but partially expose the semiconductor layer 140. Portions of the ohmic contact layers 155 and 156 may be directly in contact with the gate insulating layer 130.

The semiconductor layer 140, and the ohmic contact layers 155 and 156 are deposited by, for example, CVD, and patterned by photolithography. The semiconductor layer 140 may have island shapes or stripe shapes according to a selected mask process. If the semiconductor layer 140 has an island shape, the semiconductor layer 140, other than patterns for separating the ohmic contact layers 155 and 156, may be patterned prior to formation of data wires to be described later.

Data wires (162, 165, 166 and 168) are disposed on the ohmic contact layers 155 and 156 and the gate insulating film 130. Each of the data wires (162, 165, 166 and 168) includes a data line 162 responsible for signal transmission and is formed in a second direction (e.g., in a longitudinal direction in FIG. 3A), a source electrode 165 connected to the data line 162 and extending over the ohmic contact layers 155 and 156, a data line pad 168 connected to an end of the data line 162 and receiving a picture signal from external circuits, and a drain electrode 166 spaced apart from the source electrode 165 and formed on the ohmic contact layers 155 and 156 to be opposite to the source electrode 165 in view of the gate electrode 126 or a channel area of the thin film transistor.

The data line 162 is electrically isolated from and intersects the gate line 122 by the gate insulating film 130, and an overlapping portion formed when adjacent data lines 162 and adjacent gate lines 122 intersect defines a pixel.

The data wires 162, 165, 166 and 168 may be made of aluminum (Al), copper (Cu), silver (Ag), molybdenum (Mo), chromium (Cr), titanium (Ti), tantalum (Ta), or an alloy thereof, but not limited thereto. For example, the exemplary material may be deposited on the insulating substrate 110 by sputtering, followed by patterning using photolithography. According to a selected mask process, the underlying ohmic contact layers 155 and 156, the semiconductor layer 140, and a separate photoresist mask may be used as etch masks in the patterning process.

The data wires 162, 165, 166 and 168 may have a multi-layered structure having two or more layers, if necessary, which is the same as the gate wires 122, 124 and 126, and thus, an explanation will not be given.

The gate electrode 126, the semiconductor layer 140, the source electrode 165 and the drain electrode 166 constitute a thin film transistor (TFT) for switching a pixel electrode 182. Here, the gate electrode 126 serves as a control terminal of the TFT, and the source electrode 165 and the drain electrode 166 serve as an input terminal and an output terminal of the TFT, respectively. The semiconductor layer 140 forms a channel region of the TFT. The ohmic contact layers 155 and 156 are separated from each other in a similar manner to the source electrode 165 and the drain electrode 166, to reduce contact resistance between the ohmic contact layers 155 and 156 and the underlying semiconductor layer 140.

A passivation layer 170 is formed on the data wires 162, 165, 166, and 168, and an exposed portion of the semiconductor layer 140, and substantially covers the entire insulating substrate 110. The passivation layer 170 is preferably made of an inorganic material such as silicon nitride (SiN) or silicon oxide ($SiO_2$). In addition, the passivation layer 170 may be made of a photosensitive organic material having a good flatness characteristic. When the passivation layer 170 is made of a photosensitive organic material, a low dielectric insulating material such as a-Si:C:O and a-Si:O:F formed by plasma enhanced chemical vapor deposition (PECVD), or an inorganic insulator such as silicon nitride may be used. When the passivation layer 170 is made of an organic material, an insulation layer (not shown) made of silicon nitride (SiN) or silicon oxide ($SiO_2$) may further be provided under an organic layer to prevent an organic material of the passivation layer 170 from contacting an exposed portion of the semiconductor layer 140 between the source electrode 165 and the drain electrode 166. The passivation layer 170 may be formed by, for example, sputtering, CVD, PECVD, or the like.

Contact holes 176 and 178 exposing the drain electrode 166 and the data pad 168, respectively, are formed on the passivation layer 170. In addition, a contact hole 174 is formed on the passivation layer 170 through the gate insulating layer 130 to expose the gate pad 124.

The pixel electrode 182 is disposed on the passivation layer 170. The pixel electrode 182 is electrically connected to the drain electrode 166 via the contact hole 176. The pixel electrode 182 supplied with a data voltage generates an electric field together with a common electrode 250 of a second plate 200 (both shown in FIG. 5), thereby determining an arrangement of liquid crystal molecules in the liquid crystal layer between the pixel electrode 182 and the common electrode 250.

In addition, an auxiliary gate pad 184 and an auxiliary data pad 188 connected to the gate pad 124 and the data pad 168 via the contact holes 174 and 178, respectively, are disposed on the passivation layer 170.

In addition, a first impurity adsorption electrode 185 is disposed on a portion of the passivation layer 170 in an outer edge region of the first plate 100 which is a non-display area, e.g., in an area adjacent to the auxiliary gate pad 184 and the auxiliary data pad 188. The first impurity adsorption electrode 185 of the first plate 100 is aligned below an outermost black matrix of the second plate 200 in a light-shielding region of a non-display area of a liquid crystal panel. The first impurity adsorption electrode 185, together with a second impurity adsorption electrode 251 of the second plate 200, which will be described later, generates an impurity adsorption electric field.

The pixel electrode 182, the auxiliary gate pad 184, the auxiliary data pad 188, and the first impurity adsorption electrode 185 are made of a transparent conductive material such as ITO or IZO. For example, ITO or IZO is deposited by sputtering or reactive sputtering, and patterned by photolithography. At this time, the pixel electrode 182, the auxiliary gate pad 184, the auxiliary data pad 188, and the first impurity adsorption electrode 185 may be formed at the same time using a single photoresist pattern as an etching mask.

Figure 4A:
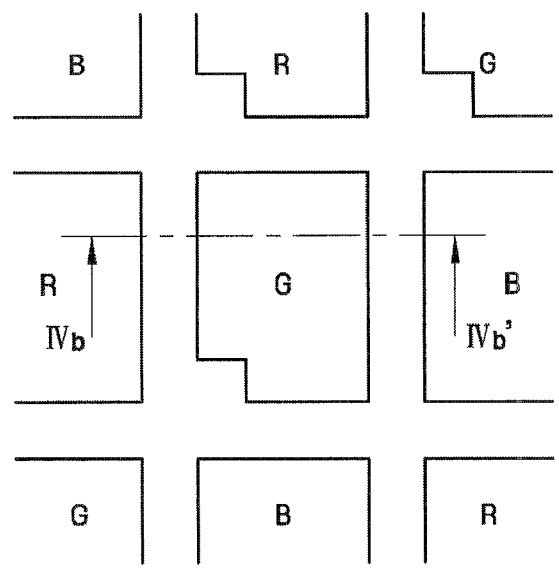
FIG. 4A is a layout view of a second plate of a liquid crystal display according to an exemplary embodiment of the present invention.
Figure 4B:
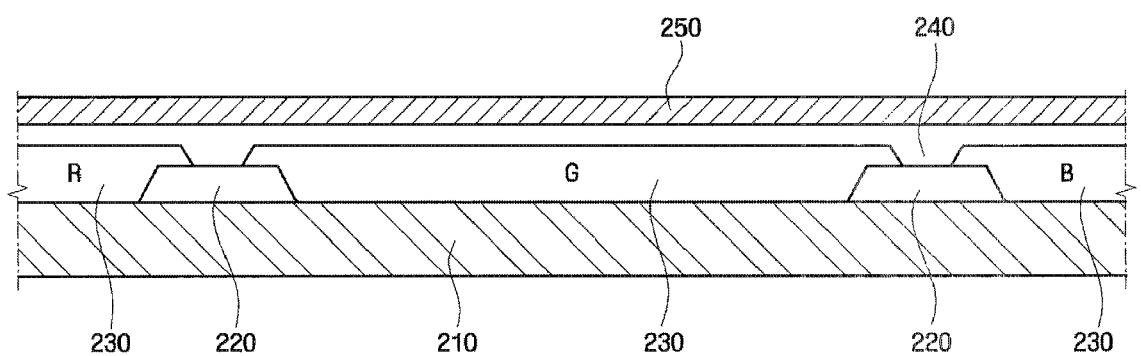
FIG. 4B is a sectional view taken along a line IVb-IVb' of FIG. 4A.

FIG. 4A is a layout view of the second plate 200 of a liquid crystal display according to an exemplary embodiment of the present invention, and FIG. 4B is a sectional view taken along a line IVb-IVb' of FIG. 4A. For brevity, all components of the second plate 200 are not shown in FIG. 4B.

Referring to FIGS. 4A and 4B, black matrix patterns 220 and an outermost black matrix (not shown), which substantially define pixel regions, are disposed on an insulating substrate 210. The black matrix patterns 220 and the outermost black matrix are made of an opaque metal (e.g., Cr) or an opaque organic material containing carbon black. The black matrix patterns 220 and the outermost black matrix may also have a stacked structure of a first layer made of chromium and a second layer made of an organic material or a stacked structure of different color filters. The black matrix patterns 220 in a display area are wide enough to cover gate lines, data lines, and thin film transistors of a first plate, but the outermost black matrix has a much greater width than the black matrix patterns 220. In a case where the black matrix patterns 220 and the outermost black matrix are made of an opaque metal such as chromium, the black matrix patterns 220 and the outermost black matrix may be formed by depositing chromium on the insulating substrate 210 and patterning the chromium layer using photolithography. In a case where the black matrix patterns 220 and the outermost black matrix are made of an organic material, preferably, a photosensitive organic mixture, the black matrix patterns 220 and the outermost black matrix may be formed by coating an organic material and patterning the coating layer by exposure and development.

Color filter patterns 230 composed of red (R), green (G), and blue (B) components are alternately arranged on the black matrix patterns 220. The color filter patterns 230 are filled in pixel regions defined by the black matrix patterns 220 and the outermost black matrix. The color filter patterns 230 may also be arranged in a different manner from that as shown in FIG. 4A. Furthermore, the color filter patterns 230 may also be composed of complementary color components of red (R), green (G), and blue (B) colors.

The color filter patterns 230 may be made of an organic material. In this case, the color filter patterns 230 may be formed by depositing a photosensitive organic mixture and patterning the organic mixture layer by exposure and development. At this time, the color filter patterns 30 composed of red (R), green (G), and blue (B) components are formed by performing the patterning three times. The color filter patterning may also be performed using an intaglio printing process or an inkjet process, but the present invention is not limited to the above-illustrated examples.

The color filter patterns 230 and the black matrix patterns 220 may partially overlap with each other. Thus, an overcoating layer 240 is formed on the entire surface of the insulating substrate 210 to planarize stepped surfaces between the color filter patterns 230 and the black matrix patterns 220. The overcoating layer 240 may be formed by spin coating, etc. using an organic material such as a thermally curable acrylic resin, a polyimide resin, or an epoxy resin.

Electrodes made of a transparent conductive material such as ITO or IZO are disposed on the overcoating layer 240. For example, the electrodes may be formed using sputtering or reactive sputtering. The electrodes are divided into a second impurity adsorption electrode (not shown) and a common electrode 250 according to position or function. The second impurity adsorption electrode is disposed on the outermost black matrix. The second impurity adsorption electrode, together with a first impurity adsorption electrode of a first plate, generates an impurity adsorption electric field. The common electrode 250 is disposed on the color filter patterns 230. The common electrode 250, together with pixel electrodes of the first plate, generates an electric field in a liquid crystal layer, to thereby adjust the alignment of liquid crystal molecules. The same voltages are applied to the second impurity adsorption electrode and the common electrode 250.

The aforementioned first and second plates are disposed to face each other, and a liquid crystal layer is interposed between the first and second plates. For example, liquid crystal molecules constituting the liquid crystal layer may be Twisted Nematic (TN) liquid crystal molecules having positive dielectric anisotropy. Alignment films are respectively disposed on a surface of the first plate facing the liquid crystal layer and a surface of the second plate facing the liquid crystal layer to allow the liquid crystal molecules to be arranged in a predetermined direction. The alignment films may be made of polyimide, etc. The alignment films are rubbed perpendicular to the liquid crystal layer. When the liquid crystal layer includes TN liquid molecules, the liquid crystal molecules may be twisted at an angle of 90 degrees with respect to the rubbing direction.

In a liquid crystal display according to the above-described embodiment of the present invention, impurity particles in a liquid crystal layer can be adsorbed to first and second impurity adsorption electrodes, thereby preventing an afterimage on a screen. Hereinafter, a principle of preventing an afterimage on the screen, and the first and second impurity electrodes will be described in more detail.

Figure 5:
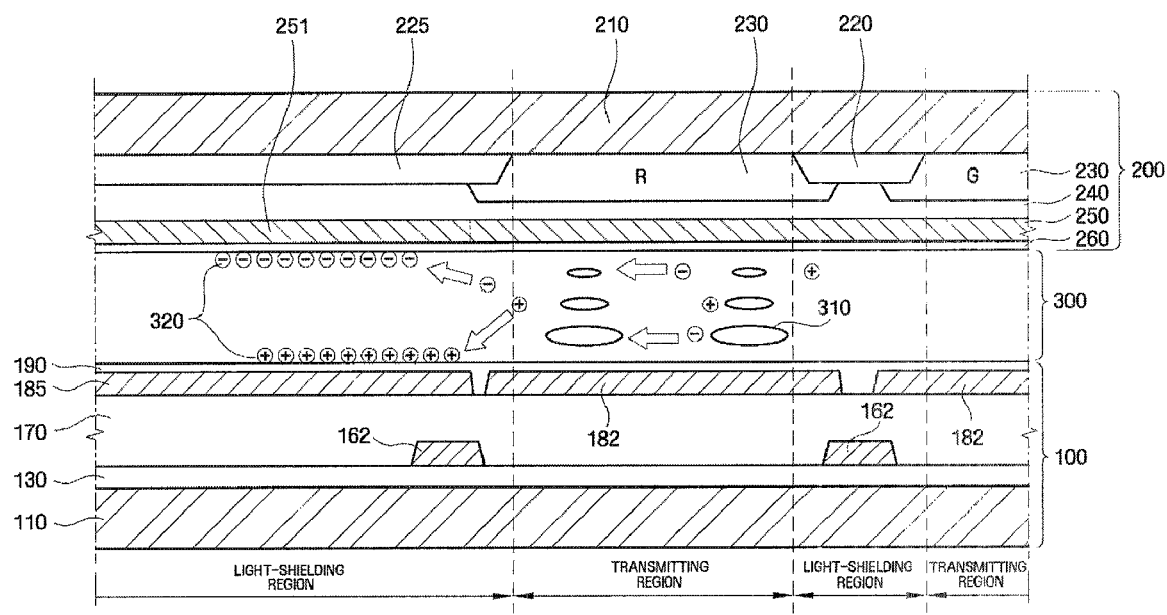
FIG. 5 is a sectional view illustrating a liquid crystal display according to an exemplary embodiment of the present invention.

FIG. 5 is a sectional view illustrating a liquid crystal display according to an exemplary embodiment of the present invention. A non-display area is also illustrated in FIG. 5.

Referring to FIG. 5, alignment films 190 and 260 are respectively disposed on surfaces of first and second plates 100 and 200, the surfaces contacting a liquid crystal layer 300. Data lines 162 disposed in the outermost region of the first plate 100 are covered with an outermost black matrix 225 of the second plate 200.

A light-shielding region defined by the outermost black matrix 225 is a light-shielding region of a non-display area, and has a much greater width than a light-shielding region of a display area. A first impurity adsorption electrode 185 is disposed in a light-shielding region of a non-display area of the first plate 100. The first impurity adsorption electrode 185 is formed in the same plane as a pixel electrode 182 to be separated from the pixel electrode 182 and has a greater width than a black matrix pattern 220 in a display area. The second plate 200 includes a common electrode 250 and a second impurity adsorption electrode 251. In the current embodiment of the present invention, the second impurity adsorption electrode 251 is formed integrally with the common electrode 250. In other words, a portion of the common electrode 250 facing the first impurity adsorption electrode 185 is defined as the second impurity adsorption electrode 251.

An external voltage different from a pixel voltage is applied to the first impurity adsorption electrode 185, and the same voltage as a common voltage applied to the common electrode 250 is applied to the second impurity adsorption electrode 251. The first impurity adsorption electrode 185 and the second impurity adsorption electrode 251 generate an impurity adsorption electric field.

When voltages applied to the first impurity adsorption electrode 185 and the second impurity adsorption electrode 251 are adjusted such that the absolute value of a potential difference between the first impurity adsorption electrode 185 and the second impurity adsorption electrode 251 is greater than the absolute value of a residual direct current (DC) bias in a transmitting region of the liquid crystal layer 300, e.g., between the pixel electrode 182 and the common electrode 250, ionic impurities 320 floating in pixel regions adjacent to the first impurity adsorption electrode 185 and the second impurity adsorption electrode 251 are much more affected by the potential difference between the first impurity adsorption electrode 185 and the second impurity adsorption electrode 251 than the residual DC bias electric field between the pixel electrode 182 and the common electrode 250. As a result, the ionic impurities 320 are adsorbed to the first impurity adsorption electrode 185 and the second impurity adsorption electrode 251, as shown in FIG. 5.

Since the same voltage as the common voltage is applied to the second impurity adsorption electrode 251, the potential difference between the first impurity adsorption electrode 185 and the second impurity adsorption electrode 251 can be adjusted by adjusting the external voltage applied to the first impurity adsorption electrode 185. The absolute value of the potential difference between the first impurity adsorption electrode 185 and the second impurity adsorption electrode 251 is determined by the absolute value of the residual DC bias between the pixel electrode 182 and the common electrode 250. However, when the absolute value of the potential difference is about 2V or more, it exceeds the residual DC bias. It is to be understood, however, that the present invention is not limited thereto.

Preferably, the external voltage applied to the first impurity adsorption electrode 185 may be a DC voltage. However, alternating current (AC) voltage may also be applied to the first impurity adsorption electrode 185 provided that the absolute value of the potential difference between the first impurity adsorption electrode 185 and the second impurity adsorption electrode 251 satisfies the above requirement. In other words, there is no limitation to the voltage applied to the first impurity absorption electrode 185 provided that the absolute value of the average potential difference between the first impurity adsorption electrode 185 and the second impurity adsorption electrode 251 is greater than the residual DC bias in a transmitting region of the liquid crystal layer 300, e.g., between the pixel electrode 182 and the common electrode 250 of a pixel region.

As described above, in the liquid crystal display according to the current embodiment of the present invention, the ionic impurities 320 are adsorbed to a light-shielding region of a non-display area, thereby reducing the concentration of the ionic impurities 320 in a pixel region. The light-shielding region of the non-display area has sufficient adsorption capability to the ionic impurities 320 since it has a wider area than a light-shielding region of a display area. Therefore, one of the afterimage-causing factors in a pixel region is removed, thereby reducing an afterimage phenomenon.

The first impurity adsorption electrode 185 and the second impurity adsorption electrode 251 are disposed in a light-shielding region of a non-display area, and thus, do not adversely affect an image display. Since an afterimage phenomenon is related to viewing images, the ionic impurities 320 adsorbed to the first impurity adsorption electrode 185 and the second impurity adsorption electrode 251 do not cause an afterimage. Meanwhile, the current embodiment of the present invention illustrates that the ionic impurities 320 adjacent to the light-shielding region of the non-display area are mainly adsorbed to the first impurity adsorption electrode 185 and the second impurity adsorption electrode 251. However, since liquid crystal molecules 310 of the liquid crystal layer 300 are circulated by convection, the ionic impurities 320 can also be moved near the light-shielding region of the non-display area by convection. The ionic impurities 320 moved near the light-shielding region of the non-display area can be easily adsorbed to the first impurity adsorption electrode 185 and the second impurity adsorption electrode 251. In the current embodiment of the present invention, since the alignment films 190 and 260 are rubbed, the liquid crystal molecules 310 and the ionic impurities 320 are actively circulated by convection, thereby ensuring high adsorption capability for the ionic impurities 320.

Figure 6:
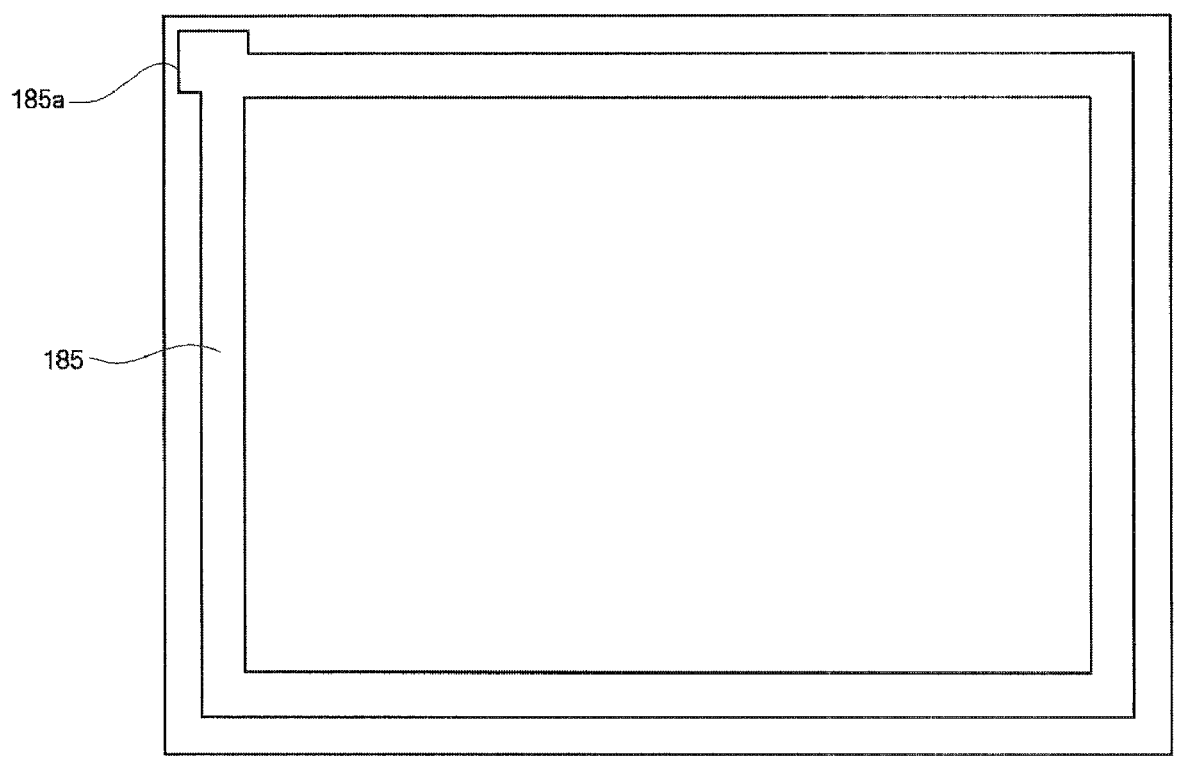
FIG. 6 is a plan view illustrating an arrangement of a first impurity adsorption electrode in a liquid crystal display according to an exemplary embodiment of the present invention.

FIG. 6 is a plan view illustrating an arrangement of a first impurity adsorption electrode 185 in a liquid crystal display according to an exemplary embodiment of the present invention.

Referring to FIG. 6, the first impurity adsorption electrode 185 is formed along a non-display area. The width of the first impurity adsorption electrode 185 is smaller than or equal to the width of an outermost black matrix of a second plate. The first impurity adsorption electrode 185 may include an adsorption electrode pad 185a that can be connected to an external power line. The adsorption electrode pad 185a may extend from one edge of the first impurity adsorption electrode 185.

FIG. 6 illustrates that the first impurity adsorption electrode 185 has a closed shape configuration. Unlike this, the first impurity adsorption electrode 185 may also be composed of separated electrode patterns when needed. If the electrode patterns are electrically connected even though they are separated, a single adsorption electrode pad can be used. On the other hand, if the first impurity adsorption electrode 185 is composed of two or more electrically separated electrode patterns, two or more adsorption electrode pads are used.

Hereinafter, a method for driving a liquid crystal display according to an embodiment of the present invention will be described.

Figure 7:
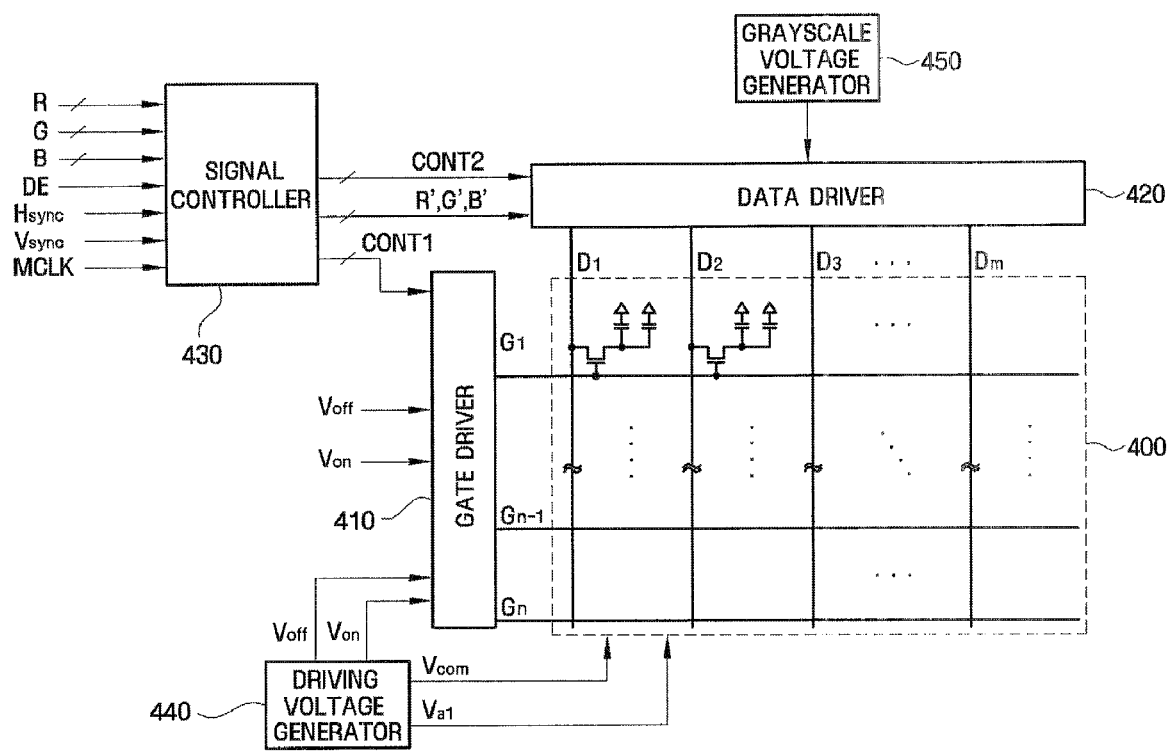
FIG. 7 is a block diagram illustrating a liquid crystal display according to an exemplary embodiment of the present invention.

FIG. 7 is a block diagram illustrating a liquid crystal display according to an exemplary embodiment of the present invention.

Referring to FIG. 7, the liquid crystal display includes a gate driver 410 and a data driver 420 that function as driving units for driving a liquid crystal panel 400, a signal controller 430 for controlling the gate driver 410 and the data driver 420, a driving voltage generator 440 for generating voltages necessary for driving the gate driver 410 and the data driver 420, and a grayscale voltage generator 450 for generating a grayscale voltage.

The signal controller 430 is connected to the gate driver 410 and the data driver 420, and generates a control signal for controlling the operation of the gate driver 410 and the data driver 420. The signal controller 430 receives image signals R, G, and B and input control signals for controlling the display of the image signals R, G, and B from an external graphics controller (not shown). For example, the input control signals may be a vertical synchronizing signal $V_{sync}$, a horizontal synchronizing signal $H_{sync}$, a main clock MCLK, a data enable signal DE, etc.

The signal controller 430 generates a gate control signal CONT1 and a data control signal CONT2 based on the input control signals and processes the image signals R, G, and B according to the operating conditions of the liquid crystal panel 400, and then, supplies the gate control signal CONT1 to the gate driver 410, and the data control signal CONT2 and image data signals R', G', and B' to the data driver 420.

The data driver 420 receives the image data signals R', G', B' corresponding to pixels in a row from the signal controller 430 according to the data control signal CONT2, selects grayscale voltages corresponding to the image data signals R', G', B' from the grayscale voltage generator 450, and converts the image data signals R', G', and B' to corresponding data voltages.

The gate driver 410 applies a gate-on voltage $V_{on}$ to gate lines $G_1, \ldots, G_n$ according to the gate control signal CONT1 from the signal controller 430 to turn on thin film transistors connected to the gate lines $G_1, \ldots, G_n$.

The driving voltage generator 440 generates the gate-on voltage $V_{on}$ and a gate-off voltage $V_{off}$ and supplies the generated gate-on voltage $V_{on}$ and gate-off voltage $V_{off}$ to the gate driver 410. Furthermore, the driving voltage generator 440 generates a first impurity adsorption voltage $V_{a1}$ and supplies the first impurity adsorption voltage $V_{a1}$ to a first impurity adsorption electrode of a first plate of the liquid crystal panel 400. The driving voltage generator 440 also generates a common voltage $V_{com}$ and supplies the common voltage $V_{com}$ to a common electrode of a second plate and a second impurity adsorption electrode formed integrally with the common electrode. The first impurity adsorption voltage $V_{a1}$ and the common voltage $V_{com}$ generate an impurity adsorption electric field. The current embodiment of the present invention illustrates that the second impurity adsorption electrode and the common electrode are connected. Thus, the common voltage $V_{com}$, instead of a separate second impurity adsorption voltage, is applied to the second impurity adsorption electrode.

Figure 8:
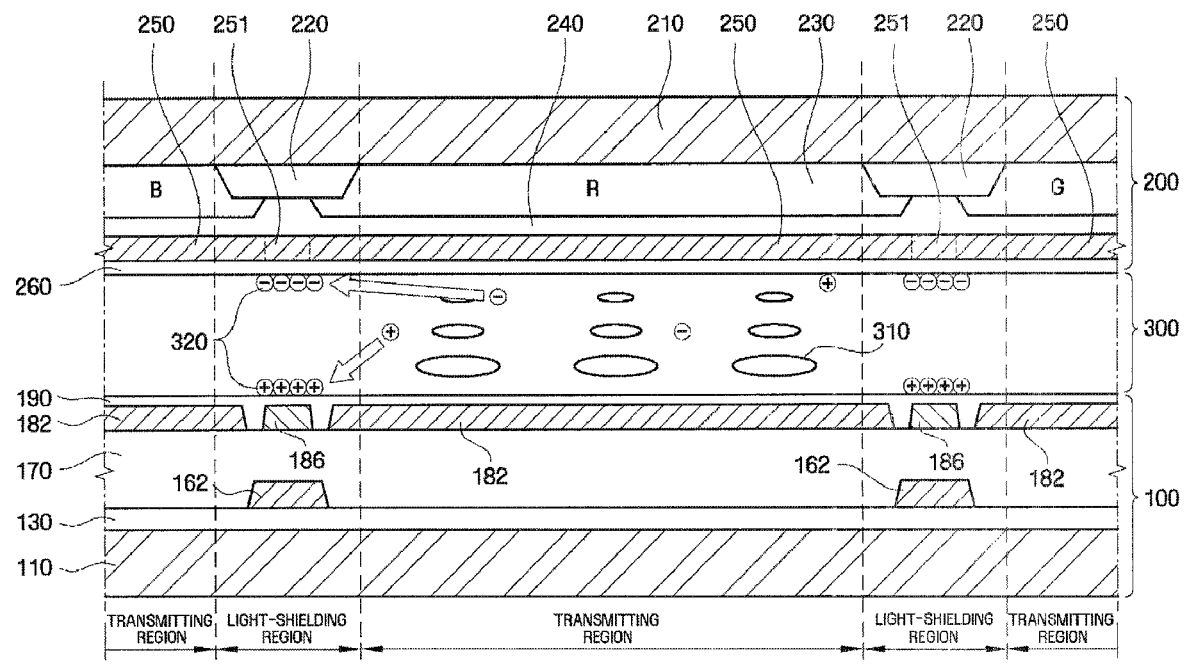
FIG. 8 is a sectional view illustrating a liquid crystal display according to an exemplary embodiment of the present invention.

FIG. 8 is a sectional view illustrating a liquid crystal display according to an exemplary embodiment of the present invention. Only a display area is illustrated in FIG. 8. The liquid crystal display according to the embodiment shown in FIG. 8 has substantially the same structure as the liquid crystal display according to the embodiment shown in FIG. 5 except that first and second impurity adsorption electrodes are disposed in light-shielding regions of a display area. Thus, a detailed description of the same or similar overlapping portions will be omitted.

Referring to FIG. 8, data lines 162 of a first plate 100 are covered with black matrix patterns 220 of a second plate 200. Although not shown, gate lines of the first plate 100 are also covered with the black matrix patterns 220 of the second plate 200. The data lines 162, the gate lines, and the black matrix patterns 220 form substantial light-shielding regions.

A first impurity adsorption electrode 186 is disposed on a passivation layer 170 of the first plate 100 to overlap with the data lines 162. Although not shown, the first impurity adsorption electrode 186 may also overlap with the gate lines. The first impurity adsorption electrode 186 may overlap with both the gate lines and the data lines 162 or either the gate lines or the data lines 162. In other words, the first impurity adsorption electrode 186 is disposed in light-shielding regions defined by the gate lines, the data lines 162, and the black matrix patterns 220.

The first impurity adsorption electrode 186 is disposed in the same plane as pixel electrodes 182, but is separated from the pixel electrodes 182. The first impurity adsorption electrode 186 may be made of the same material as the pixel electrodes 182, e.g. a transparent conductive material such as ITO or IZO. The first impurity adsorption electrode 186 and the pixel electrodes 182 may be formed at the same time by patterning.

The second plate 200 includes a second impurity adsorption electrode 251 and a common electrode 250. In the current embodiment of the present invention, the second impurity adsorption electrode 251 is formed integrally with the common electrode 250. In other words, a portion of the common electrode 250 facing the first impurity adsorption electrode 186 is defined as the second impurity adsorption electrode 251.

As described above, in the current embodiment of the present invention, the first and second impurity adsorption electrodes 186 and 251 disposed in the light-shielding regions of a display area generate an impurity adsorption electric field. Like the embodiment shown in FIG. 5, voltages applied to the first and second impurity adsorption electrodes 186 and 251 are adjusted such that the absolute value of the potential difference between the first and second impurity adsorption electrodes 186 and 251 is greater than the absolute value of a residual DC bias between the pixel electrodes 182 and the common electrode 250. For example, voltages applied to the first and second impurity adsorption electrodes 186 and 251 may be adjusted such that the potential difference between the first and second impurity adsorption electrodes 186 and 251 is about 2V or more. By doing so, ionic impurities 320 in pixel regions, which are transmitting regions, can be adsorbed to the first and second impurity absorption electrodes 186 and 251 by the potential difference between the first and second impurity adsorption electrodes 186 and 251 disposed in light-shielding regions. Therefore, the concentration of the ionic impurities 320 in the pixel regions is reduced, thereby preventing an afterimage phenomenon.

Figure 9:
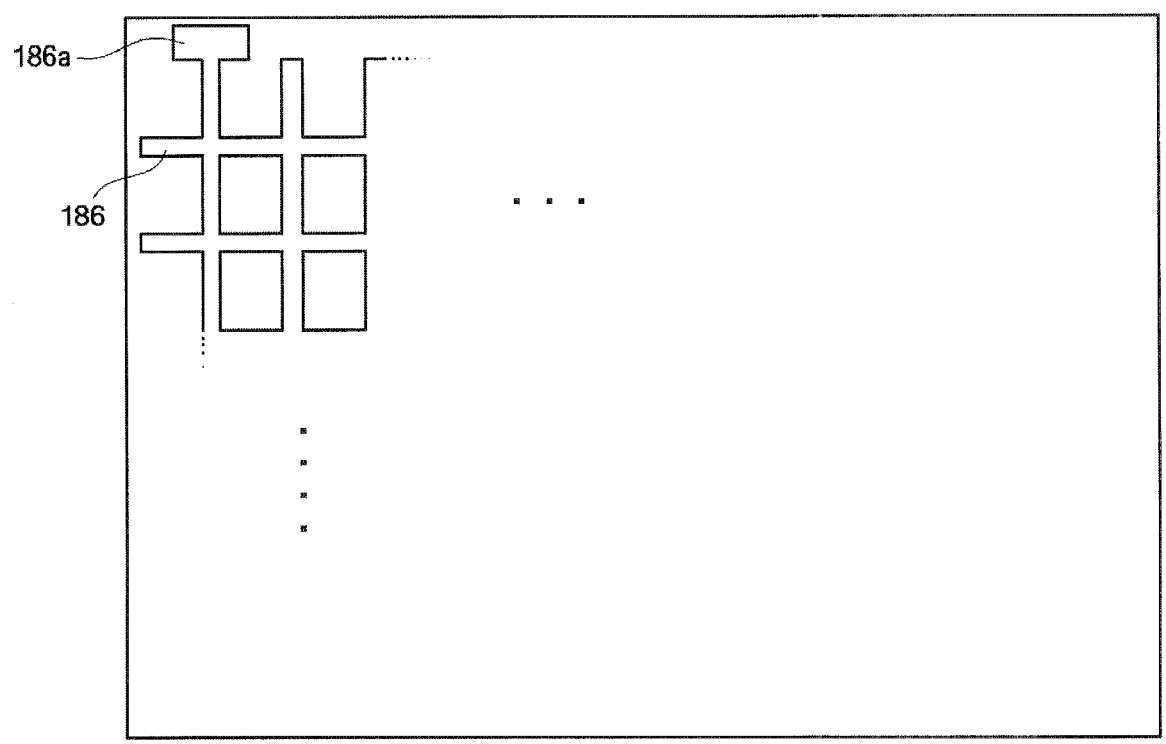
FIG. 9 is a plan view illustrating an arrangement of a first impurity adsorption electrode in a liquid crystal display according to an exemplary embodiment of the present invention.

FIG. 9 illustrates an arrangement of the first impurity adsorption electrode 186 in the liquid crystal display according to the embodiment shown in FIG. 8.

Referring to FIG. 9, the first impurity adsorption electrode 186 extends along light-shielding regions of a display area to form a lattice shape. The first impurity adsorption electrode 186 may include an adsorption electrode pad 186a that can be connected to an external power line. The adsorption electrode pad 186a may extend from one edge of the first impurity adsorption electrode 186. The adsorption electrode pad 186a may be disposed adjacent to one of an auxiliary gate pad and an auxiliary data pad of a first plate.

The first impurity adsorption electrode 186 is not disposed in all the light-shielding regions of the display area. When needed, the first impurity adsorption electrode 186 may also be patterned in a row-wise manner or a column-wise manner, or formed in only some light-shielding regions of the display area. It is to be understood however, that the present invention is not limited thereto.

The above-described embodiments shown in FIGS. 6 and 9 are not mutually exclusive and can be modified in a combined manner. An example of the combination of the embodiments of FIGS. 6 and 9 is illustrated in FIG. 10.

Figure 10:
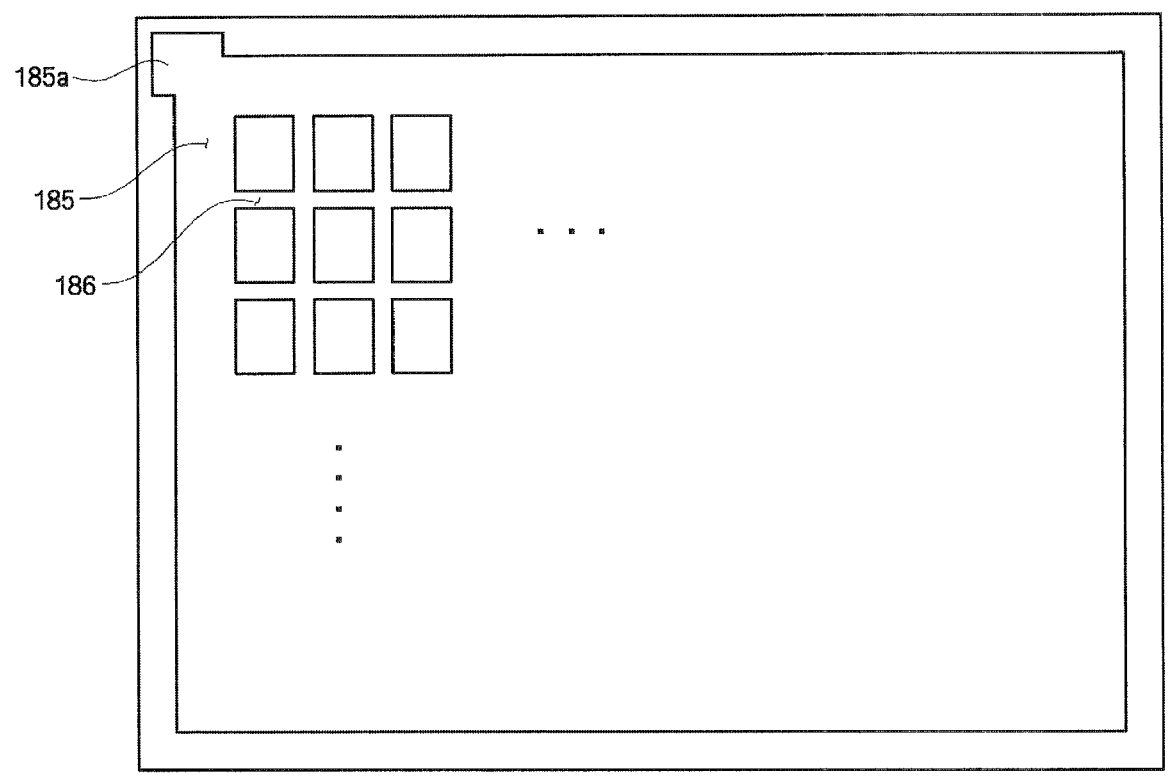
FIG. 10 is a plan view illustrating an arrangement of first impurity adsorption electrodes in a liquid crystal display according to an exemplary embodiment of the present invention.

FIG. 10 is a plan view illustrating an arrangement of first impurity adsorption electrodes in a liquid crystal display according to an exemplary embodiment of the present invention.

Referring to FIG. 10, first impurity adsorption electrodes 185 and 186 are disposed in light-shielding regions of a display area as well as in a light-shielding region of a non-display area. Ionic impurities adjacent to the light-shielding region of the non-display area can be sufficiently adsorbed to the first impurity adsorption electrode 185 having a wide area, and ionic impurities in pixel regions away from the light-shielding region of the non-display area can also be easily adsorbed to the first impurity adsorption electrode 186 disposed in the light-shielding regions of the display area. Therefore, the concentration of ionic impurities in transmitting regions of a liquid crystal layer, e.g., between pixel electrodes and a common electrode of pixel regions is further reduced, thereby further reducing an afterimage phenomenon.

Figure 11:
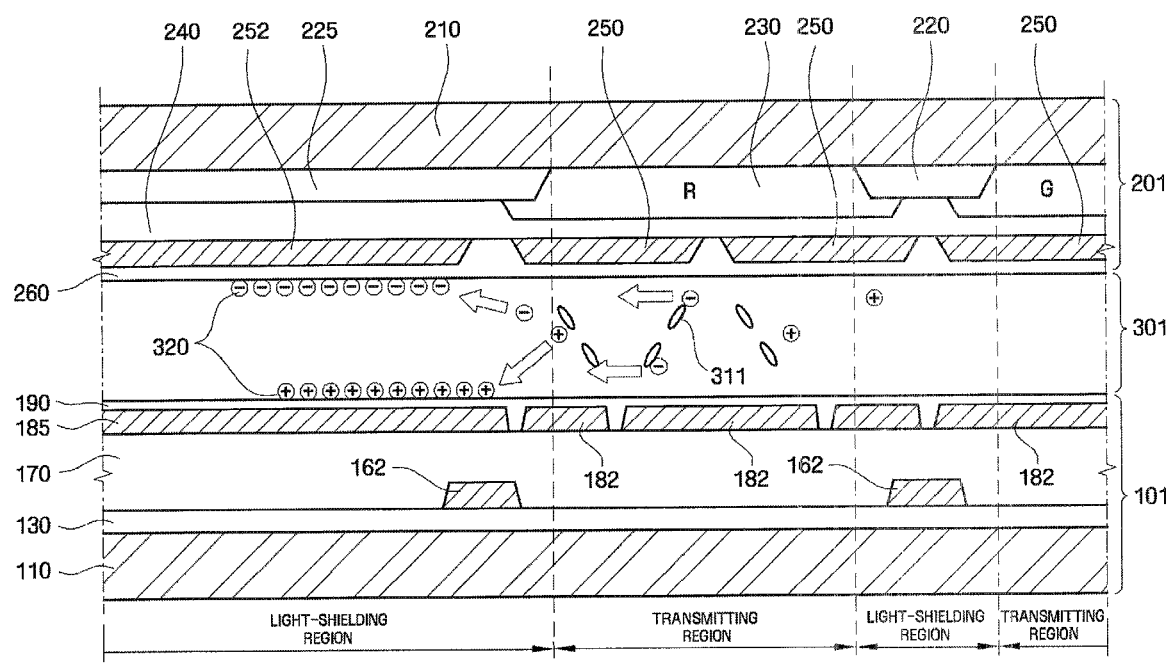
FIG. 11 is a sectional view illustrating a liquid crystal display according to an exemplary embodiment of the present invention.

While the liquid crystal display according to an embodiment of the present invention and the driving method thereof that have been described above are applied to a TN mode-type liquid crystal display by way of example, the invention is not limited thereto and can also be applied to other mode-type liquid crystal displays, as will be described hereinafter. FIG. 11 is a sectional view illustrating a liquid crystal display according to an exemplary embodiment of the present invention.

Unlike the above-described embodiments, FIG. 11 illustrates a liquid crystal display where liquid crystal molecules 311 of a liquid crystal layer 301 are aligned vertically with respect to a substrate surface. The liquid crystal molecules 311 of the liquid crystal layer 301 may have negative dielectric anisotropy. A pixel electrode 182 of a first plate 101 and a common electrode 250 of a second plate 201 are patterned for every pixel. As a result, the pixel electrode 182 and the common electrode 250 divide a pixel into a plurality of domains. The liquid crystal molecules 301 are moved in a different direction in every domain.

A first impurity adsorption electrode 185 is disposed in a light-shielding region of a non-display area of the first plate 101 so that it is separated from and disposed in the same plane as the pixel electrode 182. The first impurity adsorption electrode 185 is formed to have a greater width than the black matrix pattern 220 of a display area. The second plate 201 includes the common electrode 250 and a second impurity adsorption electrode 252. At this time, the second impurity adsorption electrode 252 is electrically separated from the common electrode 250 and disposed below an outermost black matrix 225 to face the first impurity adsorption electrode 185. The second impurity adsorption electrode 252 may be made of the same material as the common electrode 250, e.g., a, transparent conductive material such as ITO or IZO. The second impurity adsorption electrode 252 can be formed simultaneously with the common electrode 250 by patterning the common electrode 250 for domain formation.

A second impurity adsorption voltage, which is an external voltage different from a common voltage applied to the common electrode 250, is applied to the second impurity adsorption electrode 252. The second impurity adsorption voltage, together with a first impurity adsorption voltage supplied to the first impurity adsorption electrode 185, generates an impurity adsorption electric field by a potential difference between the first and second impurity adsorption voltages. In the current embodiment of the present invention, independent voltages are respectively applied to the first and second impurity adsorption electrodes 185 and 252, and thus, the impurity adsorption electric field can be more easily adjusted. Therefore, the voltage applied to the second impurity adsorption electrode 252 can be reduced as compared to when the common voltage is applied to both the common electrode 250 and the second impurity adsorption electrode 252. However, like the embodiment shown in FIG. 5, the voltages applied to the first impurity adsorption electrode 185 and the second impurity adsorption electrode 252 must be adjusted such that the absolute value of an average potential difference between the first impurity adsorption electrode 185 and the second impurity adsorption electrode 252 is greater than a residual DC bias in transmitting regions of the liquid crystal layer 301, e.g., between the pixel electrode 182 and the common electrode 250 of pixel regions.

The second impurity adsorption voltage can be generated from a driving voltage generator of a liquid crystal display, together with the first impurity adsorption voltage. It is to be understood, however, that the present invention is not limited thereto. For example, an additional second impurity adsorption voltage generator may be used.

Figure 12:
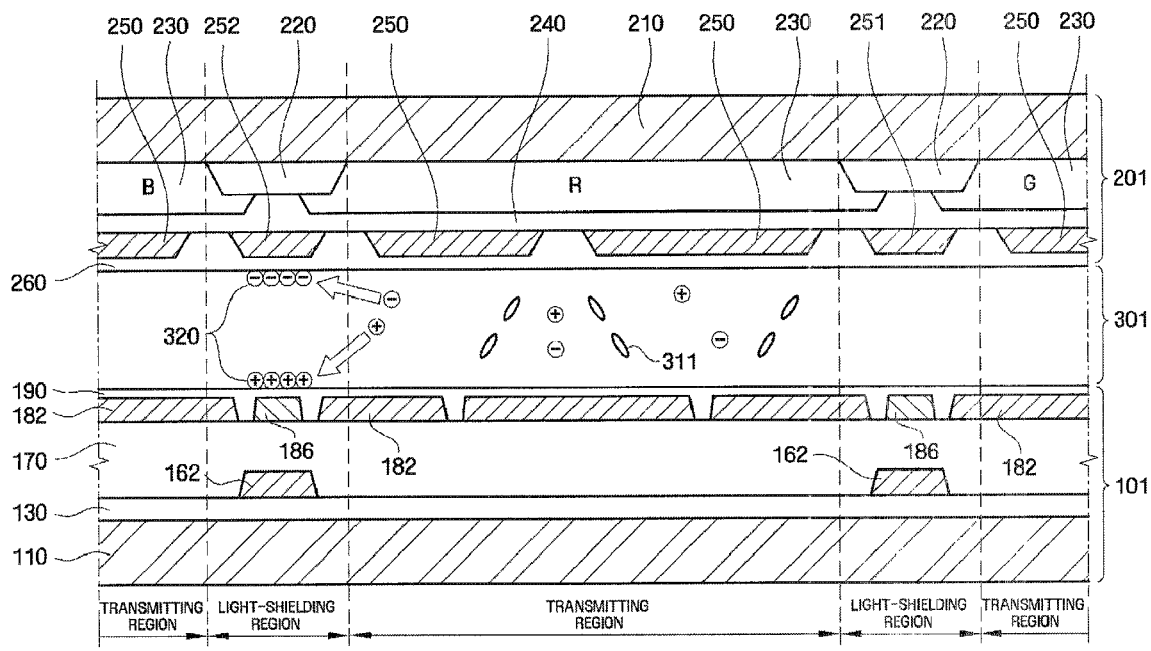
FIG. 12 is a sectional view illustrating a liquid crystal display according to an exemplary embodiment of the present invention.

FIG. 12 illustrates a liquid crystal display, according to an exemplary embodiment of the present invention. The liquid crystal display according to the embodiment shown in FIG. 12 is the same as the liquid crystal display according to the embodiment shown in FIG. 11 except that first and second impurity adsorption electrodes are disposed in light-shielding regions of a display area.

Referring to FIG. 12, a first impurity adsorption electrode 186 is formed on gate lines (not shown) and/or data lines 162 of a first plate 101. At this time, the first impurity adsorption electrode 186 is separated from a pixel electrode 182. A second impurity adsorption electrode 252 is disposed in a second plate 201 to be separated from a common electrode 250.

By combining the embodiment of FIG. 11 and the embodiment of FIG. 12, a light-shielding region of a non-display area may also include first and second impurity adsorption electrodes, in addition to the first and second impurity adsorption electrodes 186 and 252 disposed in the light-shielding regions of the display area.

The embodiments shown in FIGS. 11 and 12 have illustrated that a patterned common electrode is separated from a second impurity adsorption electrode, and a voltage different from a common voltage is applied to the second impurity adsorption electrode, but the present invention is not limited thereto. For example, in a case where a common electrode is not patterned, a second impurity adsorption electrode can be separated from the common electrode.

Furthermore, the embodiments of the present invention can be applied to an In-Plane Switching (IPS) or Plane to Line Switching (PLS) mode liquid crystal display wherein a common electrode is disposed in a first plate by separately forming a second impurity adsorption electrode in a second plate.

The foregoing embodiments of the present invention can also be applied to other display devices and driving methods. For example, the present invention can be applied to an electrophoresis device including fluid and charged particles as intermediate layers and its driving method. In this case, transmitting regions of a liquid crystal display may correspond to spaces that include charged particles reflecting incident light to constitute a display area, and light-shielding regions of the liquid crystal display may correspond to barrier ribs or other support patterns that have no relation to image display. Such an electrophoresis device can also include impurity adsorption electrodes in light-shielding regions to remove ionic impurities from transmitting regions, to thereby reduce an afterimage phenomenon. Here, the impurity adsorption electrodes may be spatially connected to the spaces. Since the structure of the electrophoresis device is well known to those of ordinary skill in the art, a detailed description thereof will be omitted.

As described above, in a liquid crystal display according to an exemplary embodiment of the present invention, an impurity adsorption electrode is disposed in a light-shielding region, and an external voltage is applied to the impurity adsorption electrode so that a potential difference greater than a residual DC bias of a pixel region is formed, thereby adsorbing ionic impurities in the pixel region to the impurity adsorption electrode. Therefore, the concentration of the ionic impurities in the pixel region can be reduced, thereby suppressing the occurrence of an afterimage phenomenon.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
 a first plate including a plurality of pixel electrodes, gate lines and data lines disposed in a display area, a first impurity adsorption electrode which is disposed along an outer edge of the display area and in the display area and separated from the pixel electrodes;
 a second plate facing the first plate and including a second impurity adsorption electrode which faces the first impurity adsorption electrode; and
 an intermediate layer interposed between the first plate and the second plate,
 wherein a portion of the first impurity adsorption electrode which is disposed in the display area overlaps with gate lines connected to control terminals of thin film transistors of first and second pixels and data lines connected to input terminals of the thin film transistors, and has a continuous pattern from the first pixel to the second pixel.

2. The display device of claim 1, wherein the intermediate layer includes liquid crystal molecules.

3. The display device of claim 1, further comprising a driving unit driving the first plate and the second plate, wherein the driving unit includes a voltage generator supplying voltages to the first impurity adsorption electrode and the second impurity adsorption electrode.

4. The display device of claim 3, wherein the voltages supplied to the first impurity adsorption electrode and the second impurity adsorption electrode are adjusted such that an absolute value of an average potential difference between the first impurity adsorption electrode and the second impurity adsorption electrode is greater than an absolute value of a residual direct current (DC) bias in a transmitting region of the intermediate layer.

5. The display device of claim 4, wherein the average potential difference between the first impurity adsorption electrode and the second impurity adsorption electrode is about 2V or more.

6. The display device of claim 1, wherein the second plate includes a common electrode and the second impurity adsorption electrode is separated from the common electrode.

7. The display device of claim 1, wherein the second plate includes a common electrode and the second impurity adsorption electrode is formed integrally with the common electrode.

8. The display device of claim 1, wherein the second plate includes an outermost black matrix formed along an outer edge of the display area, and a portion of the second impurity adsorption electrode is disposed below and overlapped with the outermost black matrix.

9. The display device of claim 1, wherein the first impurity adsorption electrode or the second impurity adsorption electrode is made of a transparent conductive material.

10. The display device of claim 1, wherein the intermediate layer includes fluid and charged particles.

11. A display device comprising:
 a first plate including a plurality of gate lines, data lines, pixel electrodes and a first impurity adsorption electrode disposed in a display region, each of the gate lines being connected to a control terminal of a thin film transistor of a pixel, each of the data lines being connected to an input terminal of the thin film transistor, each of the pixel electrodes being connected to an output terminal of the thin film transistor, the first impurity adsorption electrode being electrically isolated from and overlapping with the gate lines and the data lines and being separated from the pixel electrodes, and the first impurity adsorption electrode has a continuous pattern from one pixel to another pixel;

a second plate facing the first plate and including a lattice-shaped black matrix pattern and a second impurity adsorption electrode which is disposed below and overlapped with the black matrix pattern and faces the first impurity adsorption electrode, and a liquid crystal layer interposed between the first plate and the second plate.

12. The display device of claim 11, further comprising a driving unit driving the first and the second plate, wherein the driving unit includes a voltage generator supplying voltages to the first impurity adsorption electrode and the second impurity adsorption electrode.

13. The display device of claim 12, wherein the voltages supplied to the first impurity adsorption electrode and the second impurity adsorption electrode are adjusted such that an absolute value of an average potential difference between the first impurity adsorption electrode and the second impurity adsorption electrode is greater than an absolute value of a residual direct current (DC) bias in a transmitting region of the intermediate layer.

14. The display device of claim 13, wherein the average potential difference between the first impurity adsorption electrode and the second impurity adsorption electrode is about 2V or more.

15. The display device of claim 11, wherein the second plate includes a common electrode and the second impurity adsorption electrode is separated from the common electrode.

16. The display device of claim 11, wherein the second plate includes a common electrode, and the second impurity adsorption electrode is formed integrally with the common electrode.

17. The display device of claim 11, wherein the first impurity adsorption electrode or the second impurity adsorption electrode is made of a transparent conductive material.

18. The display device of claim 11, further comprising alignment films which are respectively disposed on surfaces of the first and second plates, the surfaces contacting the liquid crystal layer.

* * * * *